United States Patent
Ito (10) Patent No.: US 8,199,069 B2
(45) Date of Patent: Jun. 12, 2012

(54) THREE-DIMENSIONAL IMAGE DISPLAYING APPARATUS

(75) Inventor: Katsuyuki Ito, Tokyo (JP)

(73) Assignee: Oki Data Corporation, Tokyo (JP)

( * ) Notice: Subject to any disclaimer, the term of this patent is extended or adjusted under 35 U.S.C. 154(b) by 724 days.

(21) Appl. No.: 12/230,775

(22) Filed: Sep. 4, 2008

(65) Prior Publication Data

US 2009/0073557 A1 Mar. 19, 2009

(30) Foreign Application Priority Data

Sep. 14, 2007 (JP) ................................ 2007-239746

(51) Int. Cl.
*G09G 5/00* (2006.01)
(52) U.S. Cl. ...................... 345/6; 345/1.1; 345/4; 345/7
(58) Field of Classification Search ............ 345/1.1–1.3, 345/4–6
See application file for complete search history.

(56) References Cited

U.S. PATENT DOCUMENTS

| | | | |
|---|---|---|---|
| 7,148,859 B2 * | 12/2006 | Suyama et al. | 345/6 |
| 7,319,436 B2 * | 1/2008 | Tomisawa | 345/6 |
| 2004/0104871 A1 * | 6/2004 | Boldt et al. | 345/82 |
| 2004/0189819 A1 * | 9/2004 | Saito | 348/222.1 |

FOREIGN PATENT DOCUMENTS

| | | |
|---|---|---|
| JP | 10-268796 | 10/1998 |
| JP | 2000-261833 | 9/2000 |
| JP | 2000261833 | * 9/2000 |
| JP | 2007-264316 | 10/2007 |
| WO | WO-94-23340 | 10/1994 |

\* cited by examiner

*Primary Examiner* — Kevin M Nguyen
*Assistant Examiner* — Cory Almeida
(74) *Attorney, Agent, or Firm* — Kubotera & Associates, LLC (57) ABSTRACT

A three-dimensional image displaying apparatus includes a display panel formed of a plurality of pixels having a plurality of light emitting points arranged with a specific interval; a lens panel formed of a plurality of lenses arranged corresponding to the pixels for forming a virtual image of the light emitting points of each of the pixels; a drive unit for driving the light emitting points to emit light according to first drive data specifying the pixels and the light emitting points; and a transportation unit for transporting one of the display panel and the lens panel according to second drive data specifying a distance between the display panel and the lens panel. In the three-dimensional image displaying apparatus, specific ones of the lenses form the virtual images at a same position, thereby displaying one three-dimensional pixel.

10 Claims, 7 Drawing Sheets

THREE-DIMENSIONAL IMAGE DISPLAYING APPARATUS

BACKGROUND OF THE INVENTION AND RELATED ART STATEMENT

The present invention relates to a three-dimensional image displaying apparatus.

In a conventional three-dimensional image displaying apparatus such as a hologram, an interference pattern is created between light beam such as laser and light beam of an image. After the interference pattern is stored, light beam is irradiated on the interference pattern, thereby regenerating a three-dimensional image.

In an image processing apparatus such as CAD (Computer Aided Design) and a computer, the hologram has not been adopted. To this end, a conventional virtual reality displaying method has been developed for the image processing apparatus. In the conventional virtual reality displaying method, a plurality of two-dimensional image displaying apparatus such as liquid crystal displays is separately disposed corresponding to left and right eyes. The two-dimensional image displaying apparatus display corrected images, thereby regenerating a three-dimensional image (refer to Patent Reference).

Patent Reference: Japanese Patent Publication No. 09-504616

In the conventional virtual reality displaying method, it is necessary to attach the two-dimensional image displaying apparatus to a human face. Accordingly, it is difficult to use the two-dimensional image displaying apparatus while doing something else, thereby lowering operability.

In view of the above problems, an object of the present invention is to provide a three-dimensional image displaying apparatus capable of solving the problem of the conventional virtual reality displaying method. With the three-dimensional image displaying apparatus of the present invention, it is possible to display a three-dimensional image while a user is doing something else, thereby improving operability.

Further objects of the invention will be apparent from the following description of the invention.

SUMMARY OF THE INVENTION

In order to solve the above problems, according to the present invention, a three-dimensional image displaying apparatus includes a display panel formed of a plurality of pixels having a plurality of light emitting points arranged with a specific interval; a lens panel formed of a plurality of lenses arranged corresponding to the pixels for forming a virtual image of the light emitting points of each of the pixels; a drive unit for driving the light emitting points to emit light according to first drive data specifying the pixels and the light emitting points; and a transportation unit for transporting one of the display panel and the lens panel according to second drive data specifying a distance between the display panel and the lens panel.

In the three-dimensional image displaying apparatus, specific ones of the lenses form the virtual images at a same position, thereby displaying one three-dimensional pixel.

As described above, in the present invention, the three-dimensional image displaying apparatus includes the display panel formed of the pixels having the light emitting points arranged with the specific interval; the lens panel formed of the lenses arranged corresponding to the pixels for forming the virtual image of the light emitting points of each of the pixels; the drive unit for driving the light emitting points to emit light according to the first drive data specifying the pixels and the light emitting points; and the transportation unit for transporting one of the display panel and the lens panel according to the second drive data specifying the distance between the display panel and the lens panel. Accordingly, specific ones of the lenses form the virtual images at a same position, thereby displaying one three-dimensional pixel.

In the present invention, one of the display panel and the lens panel is transported according to the second drive data, and specific ones of the lenses form the virtual images at a same position. Accordingly, it is possible to display one three-dimensional pixel, thereby displaying a three-dimensional image. It is not necessary to attach the display panel to a human face. Accordingly, it is possible to display a three-dimensional image while a user is doing something else, thereby improving operability.

DETAILED DESCRIPTION OF THE PREFERRED EMBODIMENTS

Embodiments of the present invention will be explained with reference to the accompanying drawings.

First Embodiment

Figure 1:
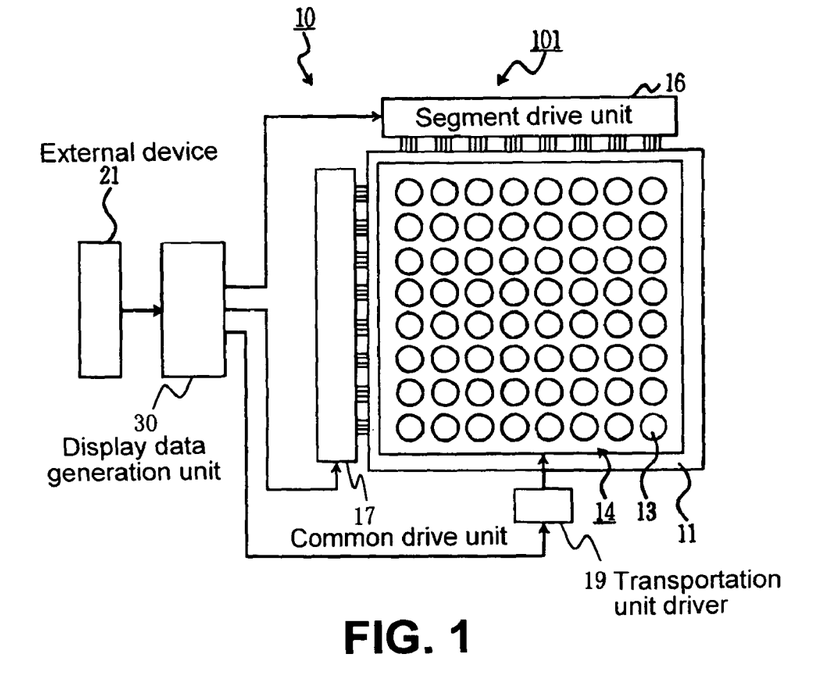
FIG. 1 is a schematic view showing a three-dimensional image displaying apparatus according to a first embodiment of the present invention.
Figure 2:
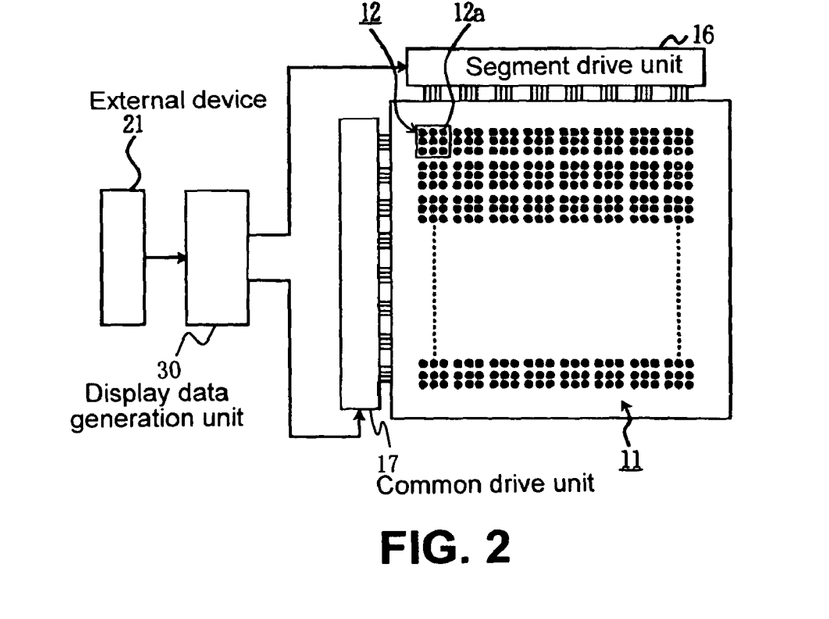
FIG. 2 is a schematic view showing a two-dimensional image displaying panel according to the first embodiment of the present invention.
Figure 3:
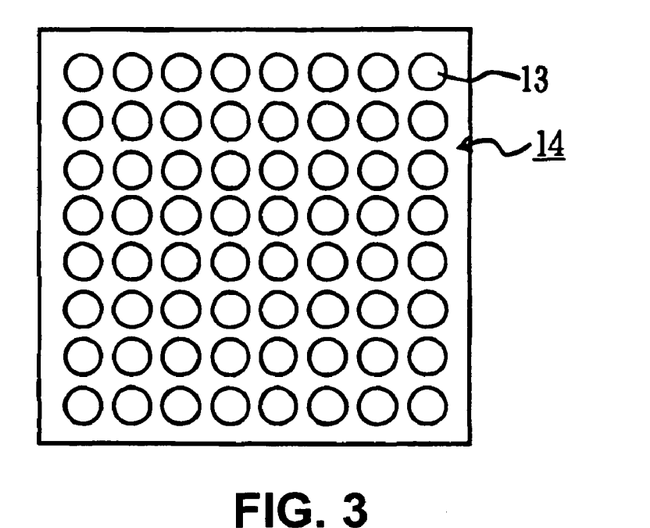
FIG. 3 is a schematic plan view showing a lens panel of the three-dimensional image displaying apparatus according to the first embodiment of the present invention.
Figure 4:
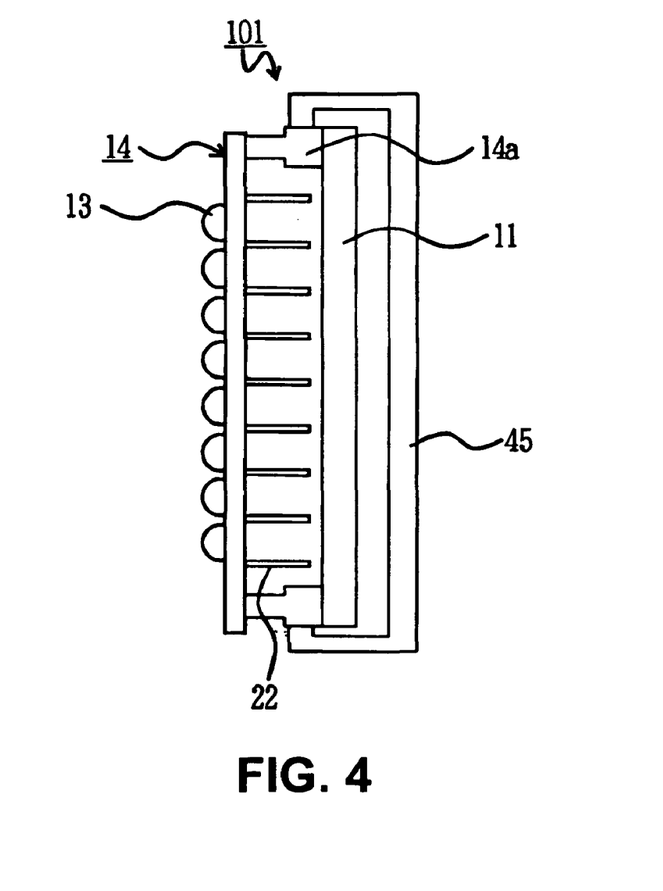
FIG. 4 is a schematic plan view showing a display unit of the three-dimensional image displaying apparatus according to the first embodiment of the present invention.

A first embodiment of the present invention will be explained. FIG. 1 is a schematic view showing a three-dimensional image displaying apparatus 10 according to a first embodiment of the present invention. FIG. 2 is a schematic view showing a two-dimensional image displaying panel 11 according to the first embodiment of the present invention. FIG. 3 is a schematic plan view showing a lens panel 14 of the three-dimensional image displaying apparatus 10 according to the first embodiment of the present invention. FIG. 4 is a schematic plan view showing a display unit 101 of the three-dimensional image displaying apparatus 10 according to the first embodiment of the present invention.

As shown in FIG. 1, the three-dimensional image displaying apparatus 10 includes the display unit 101, a display data generation unit 30, and an external device 21 such as a personal computer, a work station, and the likes. The external device 21 functions as an information terminal for generating data of an image to be displayed, i.e., image data, and sending the image data to the display data generation unit 30. When the display data generation unit 30 receives the image data, the display data generation unit 30 generates display data in color, and sends the display data to the display unit 101.

In the embodiment, the display unit 101 includes an apparatus frame 45; the two-dimensional image displaying panel 20 or a display panel 11 supported on the apparatus frame 45 for displaying a two-dimensional image; a lens panel disposed to cover the display panel 11; a segment drive unit 16 as a first drive unit; a common drive unit 17 as a second drive unit; and a transportation unit driver 19. Note that the display panel 11 constitutes a two-dimensional image displaying apparatus.

In the embodiment, the display panel 11 is arranged in parallel to the lens panel 14 with a specific distance inbetween. The transportation unit driver 19 generates a drive signal, and sends the drive signal to a transportation unit 14a. Accordingly, the transportation unit driver 19 drives the transportation unit 14a to move the lens panel 14 relative to the display panel 11, thereby adjusting a distance between the display panel 11 and the lens panel 14.

In the embodiment, the display panel 11 is formed of a plurality (more than 400) of pixels 12 arranged in a two-dimensional pattern with a specific interval. Each of the pixels 12 is formed of a ground of light emitting points 12a arranged in, for example, a 3×3 matrix pattern. Each of light emitting points 12a is formed of a light emitting diode (LED), and may be formed of a liquid crystal, a CRT, a plasma display, an organic EL, an SED, and the likes.

In the embodiment, the lens panel 14 includes lenses 13 corresponding to the pixels 12 of the display panel 11 and arranged in a two-dimensional pattern facing the pixels 12.

In the embodiment, the transportation unit 14a is disposed between the display panel 11 and the lens panel 14. A transportation terminal as a first terminal of the transportation unit 14a is fixed to the lens panel 14, and a fixing terminal as a second terminal of the transportation unit 14a is fixed to one of the display panel 11 and the apparatus frame 45. Further, the transportation unit 14a may be formed of piezo actuator using a piezo element, an actuator formed of a voice coil motor and a spring, an actuator formed of a stepping motor and a gear, and the likes. The transportation unit 14a moves the lens panel 14 relative to the display panel 11 in parallel.

In the embodiment, a light blocking plate 22 is disposed on a backside of the lens panel 14 to protrude toward the display panel 11 for dividing the lenses 13 and blocking light between the lenses 13. Accordingly, the light emitting points 12a of the display panel 11 irradiate light on only one of the lenses 13 corresponding to one of the pixels 12 where the light emitting points 12a are arranged, and not on other ones of the lenses 13 arranged adjacently.

Figure 5:
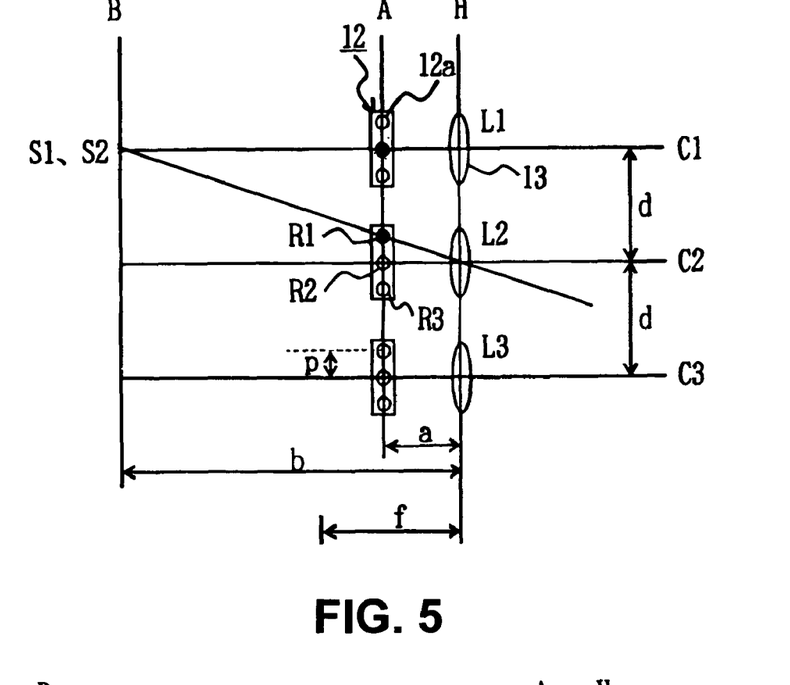
FIG. 5 is a schematic view No. 1 showing an optical system of the three-dimensional image displaying apparatus according to the first embodiment of the present invention.

FIG. 5 is a schematic view No. 1 showing an optical system of the three-dimensional image displaying apparatus 10 according to the first embodiment of the present invention.

As shown in FIG. 5, the lenses 13 (L1 to L3) have optical axes C1 to C3, respectively. Further, the lenses 13 (L1 to L3) have principle points aligned on a principle point plane H. The light emitting points 12a (R1 to R3) of the display panel 11 are aligned on a light emitting plane A. A virtual image plane B includes focal points of the lenses 13 (L1 to L3), so that the lenses 13 (L1 to L3) form virtual images of the light emitting points 12a (R1 to R3) on the virtual image plane B.

When the lenses 13 (L1 to L3) have a focal length f, the light emitting plane A is away from the principle point plane H by a light emitting point distance a, and the virtual image plane B is away from the principle point plane H by a virtual image distance b, the following relationship is obtained according to the well known formula of the lenses 13:

$$(1/a)-(1/b)=1/f \qquad (1)$$

When the lenses 13 have a magnification m, the virtual image distance b is given by:

$$b=m \times a \qquad (2)$$

Accordingly, from the equation (1), the light emitting point distance a and the virtual image distance b are given by:

$$a=f \times (1-1/m)$$

$$b=f \times (m-1) \qquad (3)$$

When the lenses 13 (L1 to L3) form virtual images of the light emitting points 12a, the following relationship is obtained:

$$a<f$$

When the pixels 12 and the lenses 13 are arranged with an interval d inbetween, the light emitting points 12a have a pitch p, and the light emitting points 12a R1 to R3 are arranged in this order with an identical interval, the light emitting points 12a R2 are situated on the optical axes C1 to C3.

In the embodiment, when the light emitting point 12a R2 in the pixel 12 on the optical axis C1 emits light, it is controlled such that the light emitting point 12a R1 in the pixel 12 on the optical axis C2 away from the optical axis C1 by the distance d emits light. As a result, a virtual image S1 of the light emitting point 12a R2 is formed at a position the same as that of a virtual image S2 of the light emitting point 12a R1. To this end, it is necessary to establish a relationship among the distance d, the virtual image distance b, the pitch p, and the light emitting point distance a as follows:

$$d/b=p/a \qquad (4)$$

From the equation (2), the distance d is given by:

$$d=m \times p \qquad (5)$$

Accordingly, it is necessary to move the lens panel 14, so that the light emitting point distance a is given by:

$$a=f \times (1-1/m)=f \times (1-p/d)$$

At this time, the virtual image distance b is given by:

$$b=f \times (m-1)=f \times (d/p-1)$$

In the embodiment, when the light emitting points 12a of the pixels 12 on two optical axes in a vertical direction or a lateral direction of the display unit 101 emit light, the relationship described above is established. In the 3×3 matrix pattern, in which eight of the pixels 12 surround center one of the pixels 12, the light emitting points 12a of the pixels 12 are selected to emit light, thereby forming nine virtual images overlapped at a same position. Further, the center one of the pixels 12 functions as one of the eight of the pixels 12 as well.

Accordingly, when a user see light passing through nine of the lenses 13, the user can see a three-dimensional image as if one of the light emitting points 12a emits light.

As described above, when specific ones of the lenses 13 form a plurality of virtual images at a same position, it is possible to display a three-dimensional image of one of the light emitting points 12a. Accordingly, it is not necessary to attach the display unit 101 to a user's face for seeing a three-dimensional image. As a result, it is possible to display the three-dimensional image while the user is doing something else, thereby improving operability.

Figure 6:
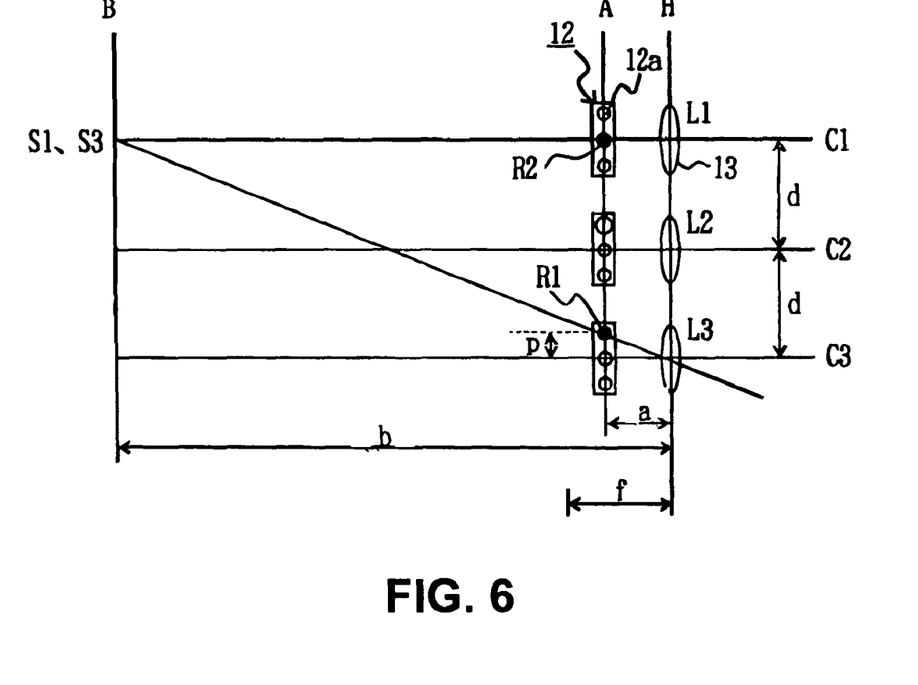
FIG. 6 is a schematic view No. 2 showing the optical system of the three-dimensional image displaying apparatus according to the first embodiment of the present invention.

FIG. 6 is a schematic view No. 2 showing the optical system of the three-dimensional image displaying apparatus 10 according to the first embodiment of the present invention. As shown in FIG. 6, it is arranged such that the virtual image distance b increases from that shown in FIG. 5.

In the optical systems on the optical axes C1 and C3, when the virtual image distance b increases to increase a depth of the virtual image, the light emitting point 12a R2 of the pixel 12 on the optical axis C1 and the light emitting point 12a R1 of the pixel 12 on the optical axis C3 away from the optical axis C1 by the distance 2d emit light. Accordingly, the virtual image S1 of the light emitting point 12a R2 is formed at a position the same as that of the virtual image S3 of the light emitting point 12a R1.

To this end, it is necessary to establish a relationship among the distance 2d, the virtual image distance b, the pitch p, and the light emitting point distance a as follows:

$$2d/b = p/a$$

From the equation (2), the distance d is given by:

$$2d = m \times p$$

When the lenses 13 has a magnification 2m, the virtual image distance b is given by:

$$b = 2m \times a$$

Accordingly, from the equation (1), the light emitting point distance a is given by:

$$a = f \times (1 - \frac{1}{2}m)$$

At this time, the virtual image distance b is given by:

$$b = f \times (2m - 1)$$

Accordingly, when the transportation unit 14a (refer to FIG. 4) moves the lens panel 14 such that the light emitting point distance a increases from $f \times (1 - 1/m)$ to $f \times (1 - \frac{1}{2}m)$, it is possible to form the virtual image S1 of the light emitting point 12a R2 at a position the same as that of the virtual image S3 of the light emitting point 12a R1 at the depth in which the virtual image distance b becomes $f \times (2m - 1)$.

Similarly, when the light emitting point 12a of the pixels 12 on the optical axis C1 and the light emitting point 12a of the pixels 12 on the optical axis Cn away from the optical axis C1 by the distance n×d (n is a natural number) emit light, the virtual image S1 of the light emitting point 12a R2 is formed at a position the same as that of an virtual image Sn of the light emitting point 12a R1.

To this end, it is necessary that the light emitting point distance a has the following relationship:

$$a = f \times (1 - 1/(n \times m))$$

At this time, it is necessary that the virtual image distance b has the following relationship:

$$b = f \times (n \times m - 1))$$

Accordingly, when the transportation unit 14a (refer to FIG. 4) moves the lens panel 14 such that the light emitting point distance a becomes $f \times (1 - 1/(n \times m))$, it is possible to form the virtual image S1 of the light emitting point 12a R2 at a position the same as that of the virtual image Sn of the light emitting point 12a R1 at the depth in which the virtual image distance b becomes $f \times (n \times m - 1))$.

In the embodiment, when the light emitting points 12a of the pixels 12 on two optical axes in a vertical direction or a lateral direction of the display unit 101 emit light, the relationship described above is established. In the 3×3 matrix pattern, in which eight of the pixels 12 are away from center one of the pixels 12 by a distance n×d, the light emitting points 12a of the pixels 12 are selected to emit light, thereby forming nine virtual images overlapped at a same position.

Figure 7:
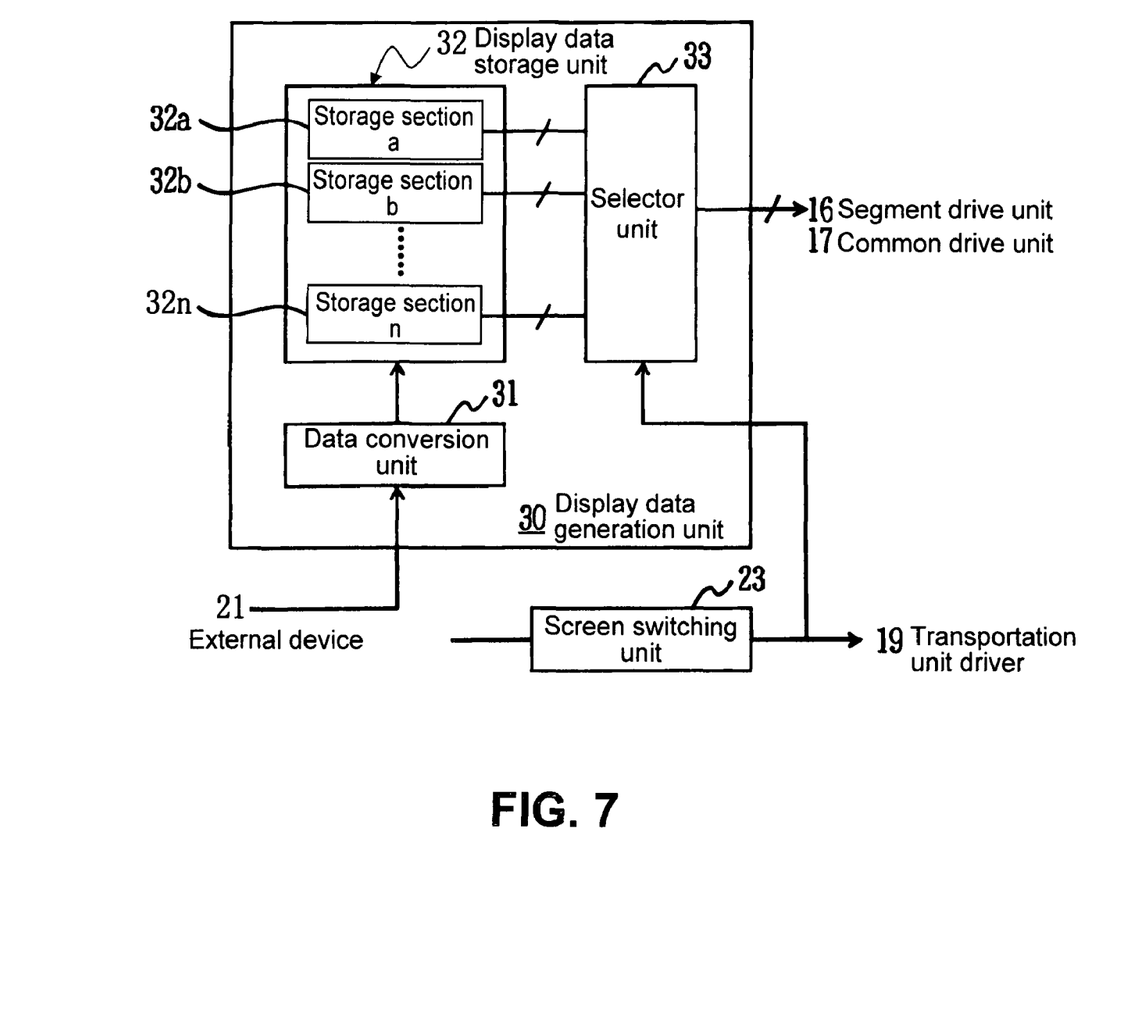
FIG. 7 is a block diagram showing a control unit of the three-dimensional image displaying apparatus according to the first embodiment of the present invention.

An operation of the display data generation unit 30 (refer to FIG. 1) will be explained next. FIG. 7 is a block diagram showing a control unit of the three-dimensional image displaying apparatus 10 according to the first embodiment of the present invention.

As shown in FIG. 7, the display data generation unit 30 includes a data conversion unit 31, a display data storage unit 32, and a selector unit 33. The display data storage unit 32 has an N number of storage sections 32a to 32n. The data conversion unit 31 sequentially stores image data sent from the external device 21 in a coded form into the display data storage unit 32. Then, the data conversion unit 31 adds data of the light emitting points 12a (refer to FIG. 2) as a depth parameter indicating a depth to the image data per three-dimensional screen formed with the three-dimensional image displaying apparatus 10 (refer to FIG. 1), thereby converting an N number of display data.

In the embodiment, the display data include first drive data formed of the image data for specifying the light emitting points 12a and the pixels 12 and illuminating the light emitting points 12a; and second drive data formed of the data of the light emitting points 12a for specifying the distance between the display panel 11 and the lens panel 14 and driving the transportation unit 14a. Note that the image data and the data of the light emitting points 12a are updated in a synchronized manner.

In the embodiment, the selector unit 33 sequentially retrieves the N number of the display data stored in the display data storage unit 32 according to a switching signal sent from a screen switching unit 23, and sends the N number of the display data to the segment drive unit 16 and the common drive unit 17.

To this end, the screen switching unit 23 generates a screen clock, and sends the screen clock signal to the selector unit 33 and the transportation unit driver 19 as the switching signal. Accordingly, it is possible to periodically switch the image data according to the N number of the screen clocks.

An operation of the three-dimensional image displaying apparatus 10 will be explained next. First, the external device 21 sends the image data in the three-dimension to the display data generation unit 30 corresponding to the N number of three-dimensional screens. When the display data generation unit 30 receives the image data, the data conversion unit 31 converts the image data of the N number of the three-dimensional screens to the display data, so that the display data are stored in the display data storage unit 32. In this case, the depth parameter is added to each of the N number of the three-dimensional screens, thereby forming the display data.

In the next step, when the display data are stored in the display data storage unit 32, the selector unit 33 sequentially retrieves the display data stored in the display data storage unit 32 according to the switching signal sent from the screen switching unit 23, and sends the display data to the segment drive unit 16 and the common drive unit 17.

In the embodiment, the transportation unit driver 19 drives the transportation unit 14a to move the lens panel 14 corresponding to the display data (an image to be displayed on the display panel 11) retrieved with the selector unit 33 according to the switching signal from the screen switching unit 23.

For example, when the display unit 101 displays a three-dimensional screen with a deep depth according to the switching signal from the screen switching unit 23, the transportation unit driver 19 moves the lens panel 14 away from the display panel 11. When the display unit 101 displays a three-dimensional screen with a shallow depth according to the switching signal from the screen switching unit 23, the transportation unit driver 19 moves the lens panel 14 toward the display panel 11. Accordingly, the transportation unit driver 19 moves the lens panel 14 corresponding to the depth parameter of the display data thus retrieved, thereby making it possible to control the distance between the lens panel 14 and the display panel 11. Note that the transportation unit driver 19 is driven to move the lens panel 14 with a drive voltage determined in advance according to the depth parameter of the three-dimensional screen.

After the transportation unit driver 19 moves the lens panel 14, the segment drive unit 16 and the common drive unit 17 are driven according to the display data thus sent. Accordingly, the center one of the light emitting points 12a of each of the pixels 12, and the selected ones of the light emitting points 12a of the pixels 12 in the surrounding positions emit light, thereby displaying one three-dimensional screen with a specific depth parameter.

An operation of the display panel 11 will be explained next. First, the segment drive unit 16 selects a segment corresponding to the display data according to the screen clock at a specific timing. When the segment drive unit 16 selects the segment, the common drive unit 17 selects and drives the pixels 12 corresponding to the segment thus selected on a first row to emit light. The process described above is repeated for each row, thereby forming one screen.

The process of forming one screen is repeated the N times according to the switching signal from the screen switching unit 23, thereby continuously forming the N number of the three-dimensional screens with various depth parameters.

When a user sees light passing through the lens panel 14, the user actually sees light passing through the lenses 13. Accordingly, the user sees light as if light is expanded from one of the pixels 12. That is, the user light from the pixels 12 expanded in a wide angle with both eyes. Accordingly, the user recognizes the pixels 12 and the depth of the three-dimensional screen. Further, the three-dimensional screen is switched according to the depth parameter, so that the user recognizes the display data as the three-dimensional image.

As described above, in the embodiment, the lens panel 14 is moved according to the three-dimensional screens with various depth parameters. Further, the virtual images of the light emitting points 12a are overlapped and displayed, thereby making it possible to display the three-dimensional image with the depth.

Further, in the embodiment, it is possible to display the three-dimensional image on the display unit 101. Accordingly, it is not necessary to attach the display unit 101 to a human face. As a result, it is possible to display the three-dimensional image while the user is doing something else, thereby improving operability.

Second Embodiment

A second embodiment of the present invention will be explained next. Components in the second embodiment similar to those in the first embodiment are designated with the same reference numerals, and provide similar effects.

Figure 8:
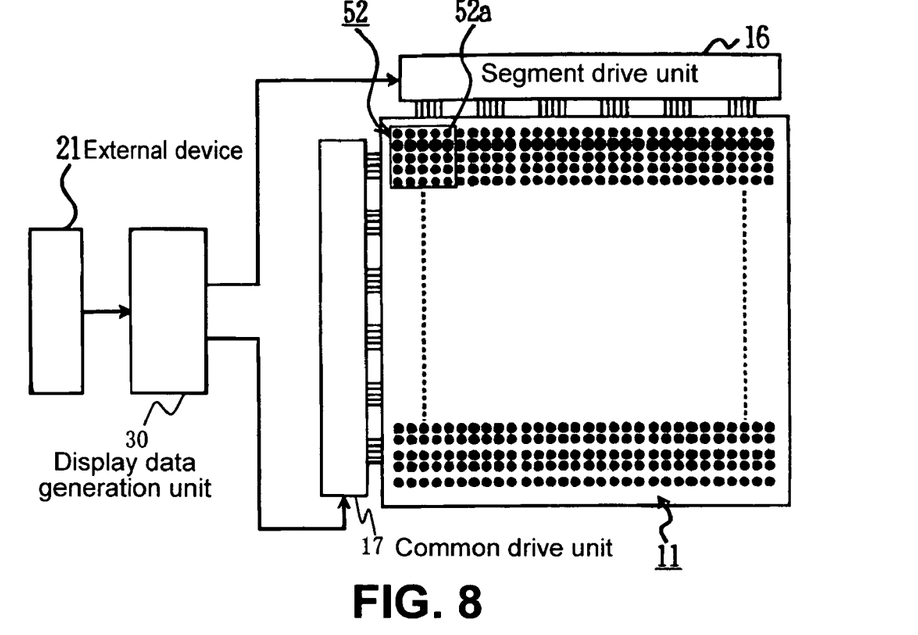
FIG. 8 is a schematic view showing a two-dimensional image displaying panel according to a second embodiment of the present invention.

FIG. 8 is a schematic view showing the two-dimensional image displaying panel 11 according to the second embodiment of the present invention. As shown in FIG. 8, the two-dimensional image displaying panel or the display panel 11 is formed of a plurality of pixels 52. Each of the pixels 52 is formed of a ground of light emitting points 52a arranged in, for example, a 5×5 matrix pattern. Further, the lens panel 14 (refer to FIG. 1) includes the lenses 13 corresponding to the pixels 52 of the display panel 11 and arranged in a two-dimensional pattern.

Figure 9:
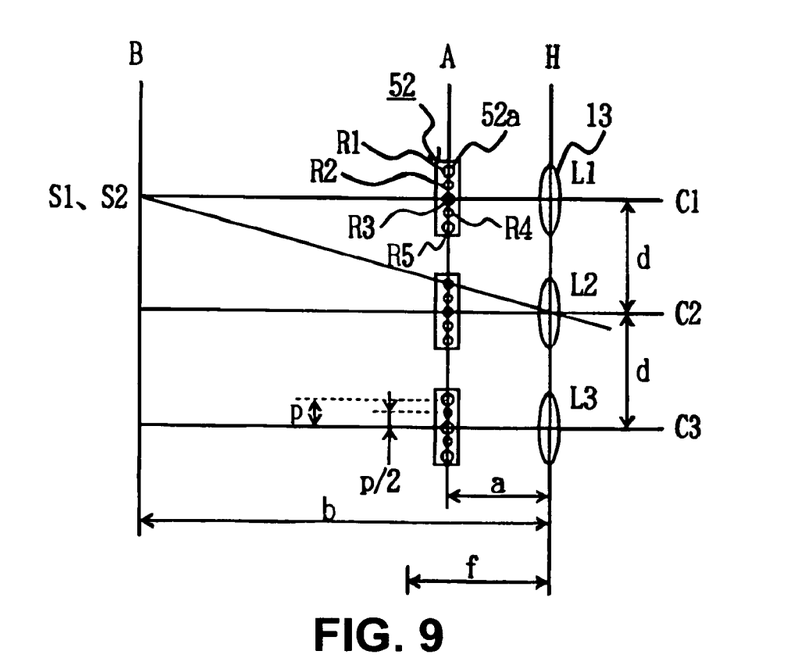
FIG. 9 is a schematic view No. 1 showing an optical system of the three-dimensional image displaying apparatus according to the second embodiment of the present invention.

FIG. 9 is a schematic view No. 1 showing an optical system of the three-dimensional image displaying apparatus according to the second embodiment of the present invention.

As shown in FIG. 9, in the lens panel 14 (refer to FIG. 1), the lenses 13 (L1 to L3) have the optical axes C1 to C3, respectively. Further, the lenses 13 (L1 to L3) have the principle points aligned on the principle point plane H. The light emitting points 52a (R1 to R5) of the display panel 11 are aligned on the light emitting plane A. The virtual image plane B includes the focal points of the lenses 13 (L1 to L3), so that the lenses 13 (L1 to L3) form the virtual images of the light emitting points 52a (R1 to R3) on the virtual image plane B.

When the lenses 13 (L1 to L3) have the focal length f, the light emitting plane A is away from the principle point plane H by the light emitting point distance a, and the virtual image plane B is away from the principle point plane H by the virtual image distance b, the following relationship is obtained according to the well known formula of the lenses 13:

$$(1/a)-(1/b)=1/f \qquad (6)$$

When the lenses 13 have the magnification m, the virtual image distance b is given by:

$$b=m\times a \qquad (7)$$

Accordingly, from the equation (6), the light emitting point distance a and the virtual image distance b are given by:

$$a=f\times(1\times 1/m)$$

$$b=f\times(m-1) \qquad (3)$$

When the lenses 13 (L1 to L3) form the virtual images, the following relationship is obtained:

$$a<f$$

When the optical axes C1 and C2 of the lenses 13 are arranged with the distance d inbetween, and the optical axes C2 and C3 of the lenses 13 are arranged with the distance d inbetween as well, center points of the pixels 52 are also arranged with the distance d inbetween. When the light emitting points 52a of the pixels 52 have the pitch p/2, and the light emitting points 52a R1 to R5 are arranged in this order with an identical interval, the light emitting points 52a R3 are situated on the optical axes C1 to C3.

In the embodiment, when the light emitting point 52a R3 in the pixel 52 on the optical axis C1 emits light, it is controlled such that the light emitting point 52a R1 in the pixel 52 on the optical axis C2 away from the optical axis C1 by the distance d emits light. As a result, the virtual image S1 of the light emitting point 52a R3 is formed at a position the same as that of the virtual image S2 of the light emitting point 52a R1. To this end, it is necessary to establish the relationship among the distance d, the virtual image distance b, the pitch p, and the light emitting point distance a as follows:

$$d/b=p/a \qquad (9)$$

From the equation (7), the distance d is given by:

$$d=m\times p \qquad (10)$$

Accordingly, it is necessary to move the lens panel 14, so that the light emitting point distance a is given by:

$$a=f\times(1-1/m)=f\times(1-p/d)$$

At this time, the virtual image distance b is given by:

$$b=f\times(m-1)=f\times(d/p-1)$$

In the embodiment, when the light emitting points 52a of the pixels 52 on two optical axes in a vertical direction or a lateral direction of the display unit 101 emit light, the relationship described above is established. In the 5×5 matrix pattern, in which eight of the pixels 52 surround center one of the pixels 52, the light emitting points 52a of the pixels 52 are selected to emit light, thereby forming 25 virtual images overlapped at a same position. Further, the center one of the pixels 52 functions as one of the other surrounding ones of the pixels 52 as well. Accordingly, when a user see light passing through 25 of the lenses 13, the user can see a three-dimensional image as if one of the light emitting points 52a emits light.

Figure 10:
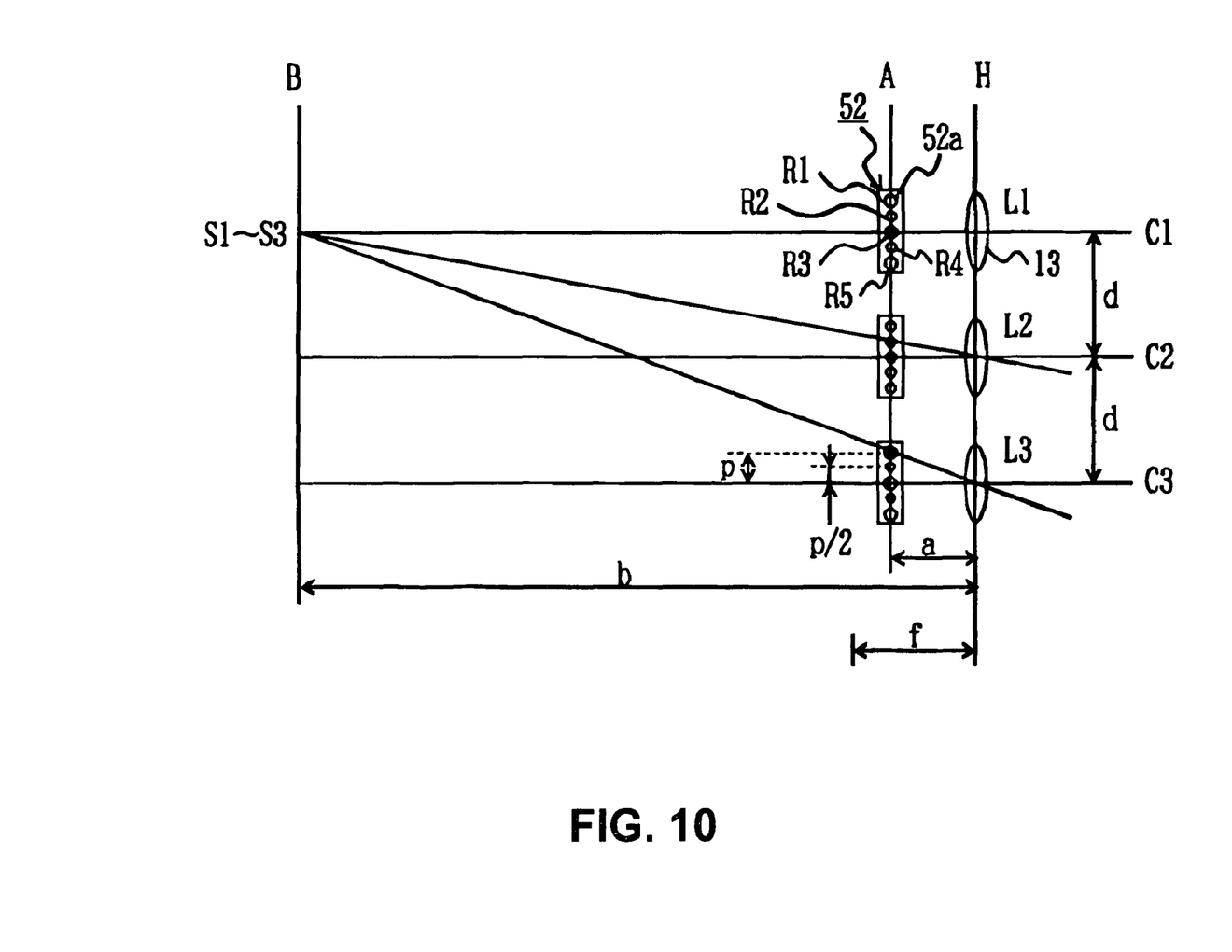
FIG. 10 is a schematic view No. 2 showing the optical system of the three-dimensional image displaying apparatus according to the second embodiment of the present invention.

FIG. 10 is a schematic view No. 2 showing the optical system of the three-dimensional image displaying apparatus according to the second embodiment of the present invention. As shown in FIG. 10, it is arranged such that the virtual image distance b increases from that shown in FIG. 9.

In the optical systems on the optical axes C1 and C3, when the virtual image distance b increases to increase a depth of the virtual image, the light emitting point 52a R3 of the pixel 52 on the optical axis C1 and the light emitting point 52a R2 of the pixel 52 on the optical axis C2 away from the optical axis C1 by the distance d emit light. At the same time, the light emitting point 52a R1 of the pixel 52 on the optical axis C3 away from the optical axis C1 by the distance 2d emits light. Accordingly, the virtual image S1 of the light emitting point 52a R3 is formed at a position the same as that of the virtual image S2 of the light emitting point 52a R2 and the virtual image S3 of the light emitting point 52a R1.

To this end, it is necessary to establish a relationship among the distance d, the virtual image distance b, the pitch p/2, and the light emitting point distance a as follows:

$$d/b=p/2a$$

From the equation (10), the distance d is given by:

$$d=m\times p/2$$

In order to form the virtual image S2 of the light emitting point 52a R2 of the lens L2 at a position the same as that of the virtual image S1 of the light emitting point 52a R3 of the lens L1, it is necessary to establish a relationship among the distance d, the virtual image distance b, the pitch p/2, and the light emitting point distance a as follows:

$$d/b=p/2a$$

$$d=m\times p/2$$

When the lenses 13 has the magnification m, the virtual image distance b is given by:

$$b=2m\times a$$

Accordingly, from the equation (6), the light emitting point distance a is given by:

$$a=f\times(1-1/m)=f\times(1-p/2d)$$

At this time, the virtual image distance b is given by:

$$b=f\times(m-1)=f\times(2d/p-1)$$

Accordingly, when the transportation unit 14a moves the lens panel 14 such that the light emitting point distance a becomes f×(1−p/2d), it is possible to form the virtual image S1 of the light emitting point 52a R3 at a position the same as that of the virtual image S2 of the light emitting point 52a R2 and the virtual image S3 of the light emitting point 52a R1 at the depth in which the virtual image distance b becomes f×(2d/p−1).

In the embodiment, when the light emitting points 52a of the pixels 52 on three optical axes in a vertical direction or a lateral direction of the display unit 101 emit light, the relationship described above is established. In the 5×5 matrix pattern, in which (5×(5−1)) of the pixels 52 surround center one of the pixels 52, the light emitting points 52a of the pixels 52 are selected to emit light, thereby forming 25 virtual images overlapped at a same position. Further, the center one of the pixels 52 functions as one of the other surrounding ones of the pixels 52 as well. Accordingly, when a user see light passing through 25 of the lenses 13, the user can recognize a depth of the pixels 52 through the virtual images of the light emitting points 52a thus overlapped.

An operation of the three-dimensional image displaying apparatus in the second embodiment is similar to that of the three-dimensional image displaying apparatus 10 in the first embodiment, and an explanation thereof is omitted.

In the embodiment, when the number of the light emitting points 52a of the pixels 52 increases so that each of the pixels 52 is formed of a number (2n+1)×(2n+1) of the light emitting points 52a, it is possible to display a three-dimensional image with a depth having n stages. In this case, when the number n increases, it is possible to form a three-dimensional image more naturally.

When the light emitting points 52a have a pitch p/n, and the pixels 52 and the lenses 13 are arranged with the distance d inbetween, the magnification m is given by:

$$m=d/(t\times(p/n))=(n\times d)/(t\times p)$$

where t is an integer number in a range of 1 to n, and is suitable for obtaining an appropriate depth.

Accordingly, the light emitting point distance a is given by:

$$a=f\times(1-1/m)=f\times(1-(t\times p)/(n\times d))$$

At this time, the virtual image distance b is given by:

$$b=f\times(m-b\ 1)=f\times((n\times d)/(t\times p)-1)$$

It is supposed that the following relationship is satisfied:

$$t\times s\le n$$

A number ((2t×s+1)×(2t×s+1)) of the pixels 52 surround the center one of the pixels 52. In this case, in the pixels 52 away from the center one of the pixels 52 by a number t×s of the pixels 52, when the light emitting points 52a away from center one of the light emitting points 52a by a number t×s of the light emitting points 52a toward the center one of the pixels 52 are selected to emit light, it is possible to overlap the virtual images of the pixels 52 surrounding the center one of the pixels 52. Note that s is an integer number in a range of 1 to n.

In this case, when t is equal to one (t=1), the virtual images are formed at a position furthest from the center one of the pixels 52. In the pixels 52 away from the center one of the pixels 52 by a number s of the pixels 52, when the light emitting points 52a away from the center one of the light emitting points 52a by a number s of the light emitting points 52a toward the center one of the pixels 52 are selected to emit light, in the number ((2t×s+1)×(2t×s+1)) of the pixels 52 surrounding the center one of the pixels 52, the magnification m is given by:

$$m=(s\times d)/(s\times(p/n))=n\times d/p$$

Accordingly, the light emitting point distance a is given by:

$$a = f \times (1 - 1/m) = f \times (1 - p/(n \times d))$$

Accordingly, it is possible to determine the distance between the lens panel 14 and the display panel 11, so that the virtual images of the number $((2t \times s+1) \times (2t \times s+1))$ of the pixels 52 can be overlapped. In this case, the virtual image distance b is given by:

$$b = f \times (m-1) = f \times ((n \times d)/p - 1)$$

When t is equal to n (t=n) and s is equal to one (s=1), the virtual images are formed at a position closest to the center one of the pixels 52. In the pixels 52 away from the center one of the pixels 52 by one of the pixels 52 in the 5×5 matrix pattern, the magnification m is given by:

$$m = d/p$$

Accordingly, the light emitting point distance a is given by:

$$a = f \times (1 - 1/m) = f \times (1 - p/d)$$

Accordingly, it is possible to determine the distance between the lens panel 14 and the display panel 11, so that the virtual images of the pixels 52 in the 5×5 matrix pattern can be overlapped. In this case, the virtual image distance b is given by:

$$b = f \times (m-1) = f \times (d/p - 1)$$

When the three-dimensional image displaying apparatus 10 is used, in most cases, the left and right eyes of the user are aligned in a horizontal direction. Accordingly, it is possible to increase the light emitting points 52*a* in a horizontal direction and decrease the light emitting points 52*a* in a vertical direction.

As described above, in the embodiment, it is possible to increase the number of the lenses 13 for displaying one pixel 52, thereby making it possible to stable display the virtual images of the light emitting points 52*a*.

Further, similar to the first embodiment, it is not necessary to attach the display unit 101 to a human face. As a result, it is possible to display the three-dimensional image while the user is doing something else, thereby improving operability.

Third Embodiment

A third embodiment of the present invention will be explained next. Components in the third embodiment similar to those in the first and second embodiments are designated with the same reference numerals, and provide similar effects.

Figure 11:
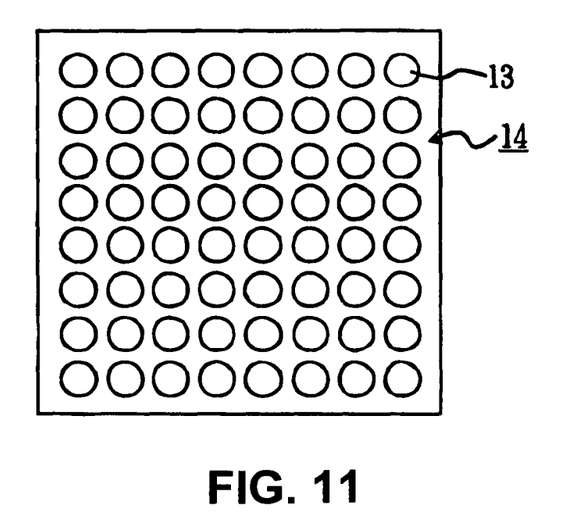
FIG. 11 is a schematic plan view showing a lens panel of a three-dimensional image displaying apparatus according to a third embodiment of the present invention.
Figure 12:
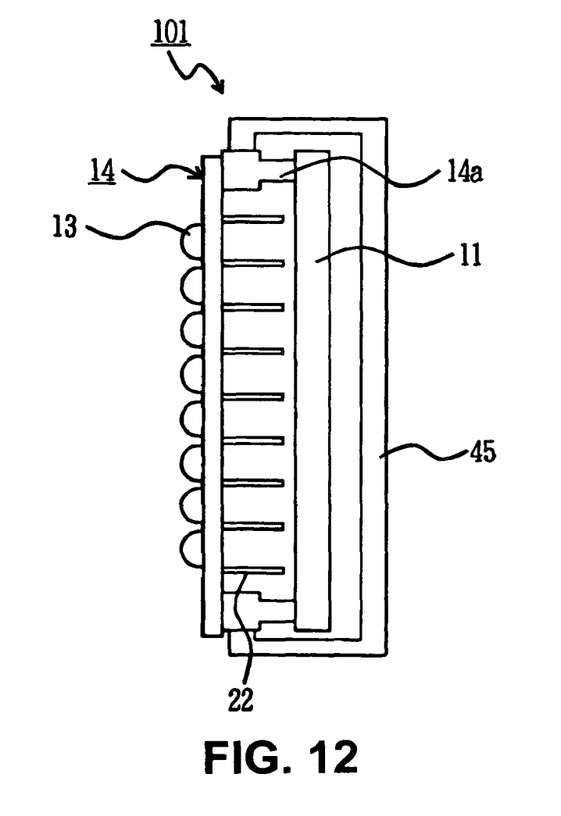
FIG. 12 is a schematic plan view showing a display unit of the three-dimensional image displaying apparatus according to the third embodiment of the present invention.

FIG. 11 is a schematic plan view showing the lens panel 14 of a three-dimensional image displaying apparatus according to the third embodiment of the present invention. FIG. 12 is a schematic plan view showing the display unit 101 of the three-dimensional image displaying apparatus according to the third embodiment of the present invention.

As shown in FIGS. 11 and 12, the transportation unit 14*a* is disposed between the display panel 11 and the lens panel 14. The transportation terminal as the first terminal of the transportation unit 14*a* is fixed to one of the display panel 11 and the apparatus frame 45, and the fixing terminal as the second terminal of the transportation unit 14*a* is fixed to the lens panel 14.

In the embodiments described above, the printer is explained as the image forming apparatus, and the present invention is applicable to a copier, a facsimile, a multifunction product, and the likes. Further, it is possible to display fine definition information, so that the present invention is applicable for displaying a CAD design.

The disclosure of Japanese Patent Application No. 2007-239746, filed on Sep. 14, 2007, is incorporated in the application.

While the invention has been explained with reference to the specific embodiments of the invention, the explanation is illustrative and the invention is limited only by the appended claims.

What is claimed is:

1. A three-dimensional image displaying apparatus, comprising:
   a display panel formed of a plurality of pixels having a plurality of light emitting points formed of LEDs or organic ELs and arranged with a specific interval;
   a lens panel formed of a plurality of lenses arranged corresponding to the pixels for forming a virtual image of the light emitting points of each of the pixels;
   a display data generation unit for generating display data according to image data in three-dimension transmitted from an external device based on a depth parameter of the image data, said display data including first drive data for specifying the pixels and the light emitting points and second drive data for specifying a distance between the display panel and the lens panel;
   a drive unit for driving the light emitting points to emit light according to the first drive data; and
   a transportation unit for transporting one of the display panel and the lens panel to adjust the distance according to the second drive data so that specific ones of the lenses form the virtual images at a same position for displaying one pixel three-dimensionally,
   wherein said display data generation unit is arranged to select specific light emitting points in each of specific pixels situated at specific positions around one pixel to be a center point, and to generate the display data so that the specific ones of the lenses spatially overlap the virtual images of the specific light emitting points.

2. The three-dimensional image displaying apparatus according to claim 1, further comprising an apparatus frame for supporting the display panel, said transportation unit including a transportation terminal and a fixing terminal, said transportation terminal being fixed to the lens panel, said fixing terminal being fixed to one of the display panel and the apparatus frame.

3. The three-dimensional image displaying apparatus according to claim 1, further comprising an apparatus frame for supporting the display panel, said transportation unit including a transportation terminal and a fixing terminal, said transportation terminal being fixed to one of the display panel and the apparatus frame, said fixing terminal being fixed to the lens panel.

4. The three-dimensional image displaying apparatus according to claim 1, wherein said drive unit is arranged to drive the light emitting points to emit light according to the first drive data updated in synchronization with the second drive data.

5. The three-dimensional image displaying apparatus according to claim 1, wherein said lens panel includes a first lens having a first optical axis and a second lens having a second optical axis, said first lens and said second lens being arranged so that the first optical axis is away from the second optical axis by a distance d, and the following relationship is satisfied:

$$d/b = p/a$$

where a is a distance between a light emitting plane of the light emitting points and a principle point plane of the lenses, b is a distance between the principle point plane and a virtual image plane where the virtual images are formed, and p is the specific interval of the light emitting points.

6. The three-dimensional image displaying apparatus according to claim 5, wherein said display data generation unit is arranged to select a first light emitting point on the first optical axis and a second light emitting point away from a third light emitting point on the second optical axis by the specific interval p to generate the display data so that a virtual image of the first light emitting point is spatially overlapped with a virtual image of the second light emitting point.

7. The three-dimensional image displaying apparatus according to claim 5, wherein said lens panel includes the lenses having a focal length f so that the following relationship is satisfied:

$$(1/a)-(1/b)=1/f.$$

8. The three-dimensional image displaying apparatus according to claim 1, wherein said transportation unit is formed of a piezo actuator using a piezo element.

9. The three-dimensional image displaying apparatus according to claim 1, wherein said transportation unit is formed of an actuator formed of a voice coil motor and a spring.

10. The three-dimensional image displaying apparatus according to claim 1, wherein said transportation unit is formed of an actuator formed of a stepping motor and a gear.

* * * * *